United States Patent [19]
Porter

[11] 3,810,512
[45] May 14, 1974

[54] HARVESTING APPARATUS FOR REMOVING CROPS FROM PLANTS OR VINES

[76] Inventor: Wellington W. Porter, R.D. 2, Dublin Rd., Waterloo, N.Y. 13165

[22] Filed: Dec. 1, 1972

[21] Appl. No.: 311,253

[52] U.S. Cl. .................................. 171/14, 171/27
[51] Int. Cl. ........................................... A01d 17/04
[58] Field of Search ........ 171/14, 27, 127, 126, 130

[56] References Cited
UNITED STATES PATENTS

| | | | |
|---|---|---|---|
| 2,468,639 | 4/1949 | Sample | 171/127 |
| 3,473,613 | 10/1969 | Boyce | 171/14 |
| 3,633,677 | 1/1972 | Walker | 171/14 |
| 3,106,249 | 10/1963 | Zachery | 171/14 |
| 3,199,604 | 8/1965 | Lorenzen et al. | 171/27 |

Primary Examiner—Antonio F. Guida
Attorney, Agent, or Firm—Charles S. McGuire

[57] ABSTRACT

Plants or vines having vegetables or fruit, e.g., tomatoes, attached thereto are picked up from ground level and deposited on a shaker belt formed of transverse links spaced more widely than the largest nominal dimension of the crops being harvested. As the plants are transported along the surface of the belt, the latter is oscillated to shake the fruit loose from the plants. Thus, the fruit may fall through the belt, between the links, while the plants remain thereon. A second belt is encircled by the first to catch the fruit falling therethrough. The second belt is also formed of spaced links, to allow dirt, etc., to fall through, but spaced more closely than the smallest nominal dimension of fruit to be harvested. The shaker belt is oscillated by a plurality of rotating arms along each side, the arrangement and means of driving the arms being such that optimum shaking motion is achieved.

10 Claims, 10 Drawing Figures

HARVESTING APPARATUS FOR REMOVING CROPS FROM PLANTS OR VINES

BACKGROUND OF THE INVENTION

The present invention relates to crop harvesting apparatus and, more particularly, to apparatus for separating crops from plants or vines and automatically transporting the crops to a final delivery point.

Special machinery has been devised to automate partially or fully the harvesting of many different types of food crops, including fruits and vegetables growing on plants or vines. One of the tasks involved is the separation of the crop from the plant or vine, which may be performed after cutting, digging, or otherwise separating the plant itself from the ground. Some crops of this type may be conveniently separated from the plant by subjecting the latter to a shaking motion sufficient to dislodge the crops initially attached thereto.

Harvesting apparatus designed to accomplish the aforementioned task must provide the required motion while protecting the crops from damage. For example, while some vine growing crops such as potatoes may be subjected to reasonably rough handling without undue damage, others such as tomatoes are more fragile and, depending on the intended use, may be unusable if crushed or bruised. Thus, harvesting machines suitable for separating crops such as tomatoes from the plants must be sturdy enough for field operation while still handling the crops in a manner that will not produce undue damage or other crop loss.

It is a principal object of the present invention to provide harvesting apparatus which will effectively separate food crops from plants or vines while not damaging relatively fragile crops, such as tomatoes.

A further object is to provide novel and improved apparatus for imparting oscillatory, shaking motion to plants or vines sufficient to dislodge crops initially attached thereto, and separately discharging the harvested plants and crops.

Another object is to provide novel harvesting apparatus suitable for automatically separating food crops such as tomatoes, peppers, and the like, from soil, racks, plants and other foreign matter and transporting the separated crops to a delivery station for packing or fuurther processing.

Further objects will in part be obvious and will in part appear hereinafter.

SUMMARY OF THE INVENTION

Plants or vines with crops attached are placed on a continuous shaker belt which travels around a path defined by sprockets and rollers. The portion of the belt over which the plants travel is supported by a plurality of rotating arms having rollers on each end, and arranged along each lateral side of the belt in spaced relation. As the arms are rotated the belt is moved thereby in an oscillating manner transverse to its direction of travel. Alternate arms on the same side of the belt are arranged at 90° to one another so that the oscillatory motion is wavelike along each side. Also, the arms are arrranged in opposing pairs along each side of the belt and the separate drive mechanisms are employed to rotate the arms on the two sides at different speeds, thereby producing an oscillating side-to-side motion. An additional arm is provided on one side to provide an eccentric tensioning of the belt, producing some oscillatory longitudinal motion. The combination of the several simultaneous motions of the shaker belt is effective to dislodge the crops from plants or vines traveling along the belt.

The shaker belt is a chain type conveyor having spaces between the links wide enough to permit the fruits or vegetables to fall through once they are separated from the plants. That is, the links of the conveyor chain are spaced more widely than the largest nominal dimension of the crops to be harvested by the machine. The plants or vines, being longer than the largest dimension of the crops, tend to remain on the shaker belt, and are discharged therefrom as the belt begins downward travel.

A second continuous belt is encircled by the shaker belt, and the two belts are rotated about parallel axes. The upper surface of the second belt is arranged to receive matter passing through the shaker belt. The second or catcher belt is also preferably a chain type conveyor having links spaced more closely than the smallest nominal dimension of crop being harvested, whereby the crops are retained on the catcher belt with dirt, small stones, and the like being allowed to fall through. Receiving means, which may comprise a further conveyor belt, are disposed to receive the crops discharged from the catcher belt as it begins its downward travel. Thus, the receiving means are also encircled, at least partly, by the shaker belt. The invention is disclosed in a complete harvesting machine which includes means for severing growing plants, transporting them to the shaker belt, separating the crops in the manner previously described, and transporting the crops to a final delivery point after passing through a visual inspection and manual sorting station.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

DESCRIPTION OF THE PREFERRED EMBODIMENT

The disclosed embodiment of the apparatus is propelled and powered by an external source, such as a tractor, but a suitable engine, steering mechanism, etc., could be incorporated, if desired, to make the machine self-propelled. Tongue 10 extends from the main frame of the harvesting machine for attachment in the usual manner to a tractor draw bar. Power take-off drive shaft 12 is connected to the tractor P.T.O. unit to transmit the necessary power to the main hydraulic system, denoted generally by reference numeral 14, through transfer mechanism 13 by conventional power transmission couplings. The harvesting machine is equipped in conventional fashion with adjustable slip clutches, relief valves and other such power transmission safety devices. Hydraulic lines 16 lead from the manifold, through selectively controlled valves, (not shown) to a plurality of hydraulic motors 18 which drive various individual conveyors and other moving parts, as described later in more detail.

Figure 3:
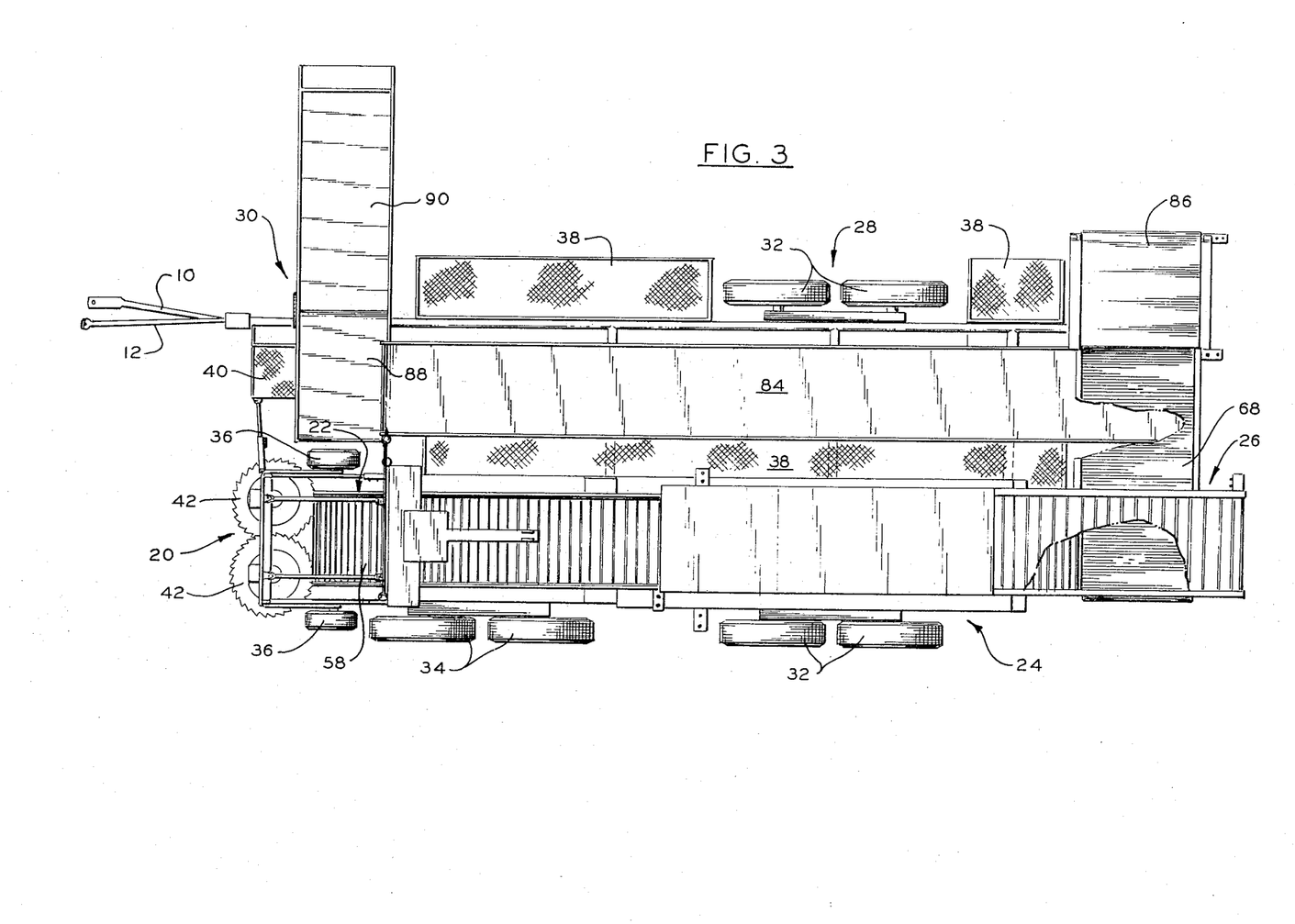
FIG. 3 is a top plan view of the apparatus.

The machine generally comprises cutter section 20, feeder section 22, shaker section 24, rear lateral conveyor section 26, sorting section 28, and discharge section 30, all of which may be seen in FIG. 3. The main frame of the machine is supported for movement on wheels 32, a pair of tandem wheels 34 are provided to support feeder section 22, and a smaller pair of wheels 36 adjustably support cutter section 20. Platforms 38 are affixed to the frame to support several workers on each side of sorting section 28, and platform 40 is provided for the supervisor of the sorting crew at the head of this section. Manual controls for the aforementioned valves controlling hydraulic motors 18 are preferably located for easy access by the supervisor standing on platform 40. A canopy (not shown) may be mounted in covering relation to the sorting section to protect workers from sun and rain.

Cutter section 20 is designed to sever plants approximately at ground level and deliver them, with the fruit or vegetables intact, to feeder section 22. A pair of disks 42 having saw tooth cutting edges are supported in side-by-side relation with their adjacent edges overlapping. Dome-shaped elements 44 are affixed to the upper surfaces of disks 42 and cover a substantial portion thereof. The disks and dome-shaped elements are fixedly supported on the ends of rotatable shafts extending from gear boxes 46 through sleeves 48. Drive shafts 50 are powered by hydraulic pumps 52 and transmit rotation to the disks in opposite directions so that the leading edges of the disks move toward one another.

Figure 1:
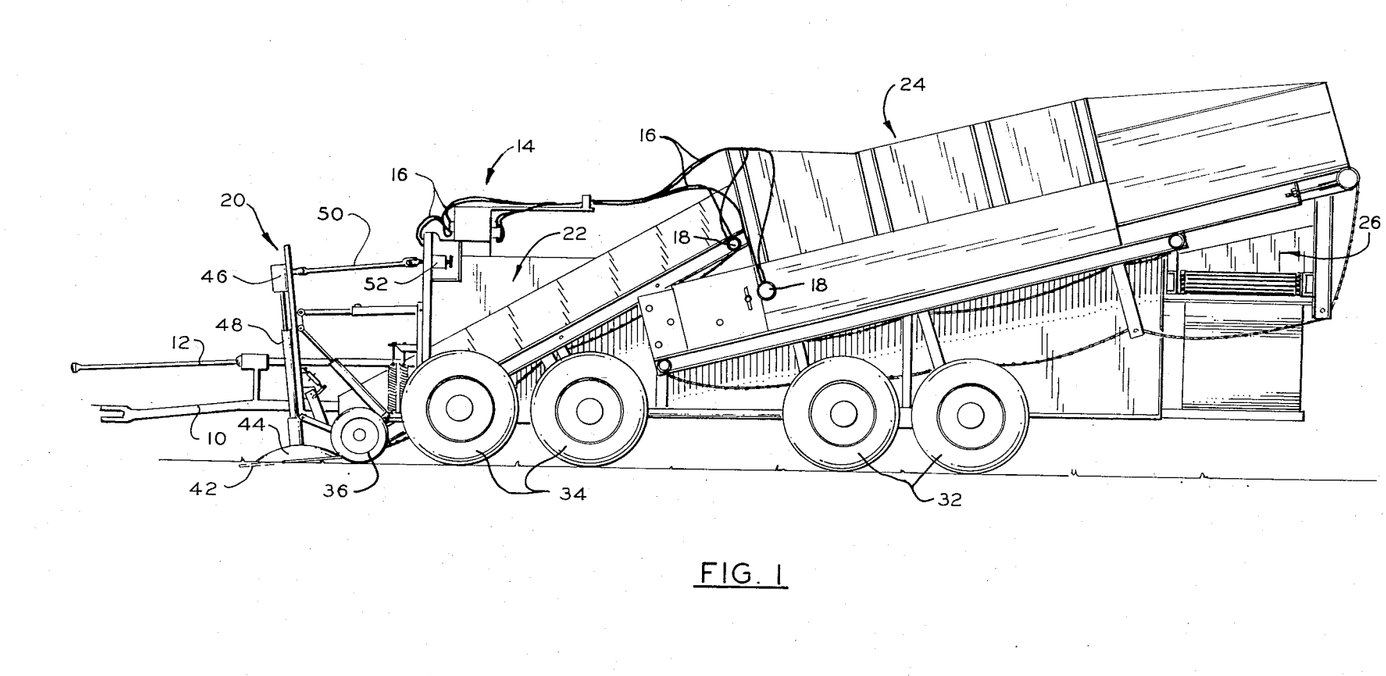
FIG. 1 is an elevational view of one side of the harvesting apparatus.
Figure 2:
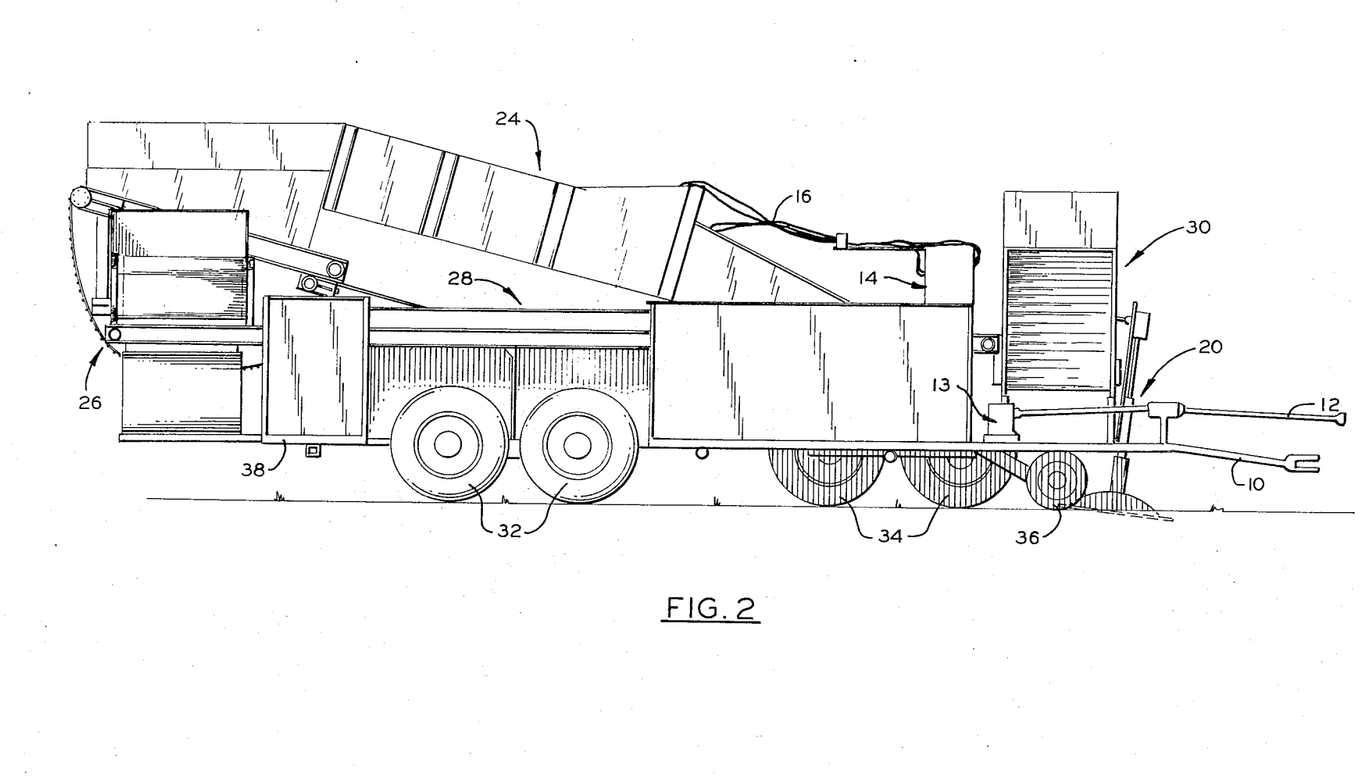
FIG. 2 is an elevational view of the opposite side.
Figure 6:
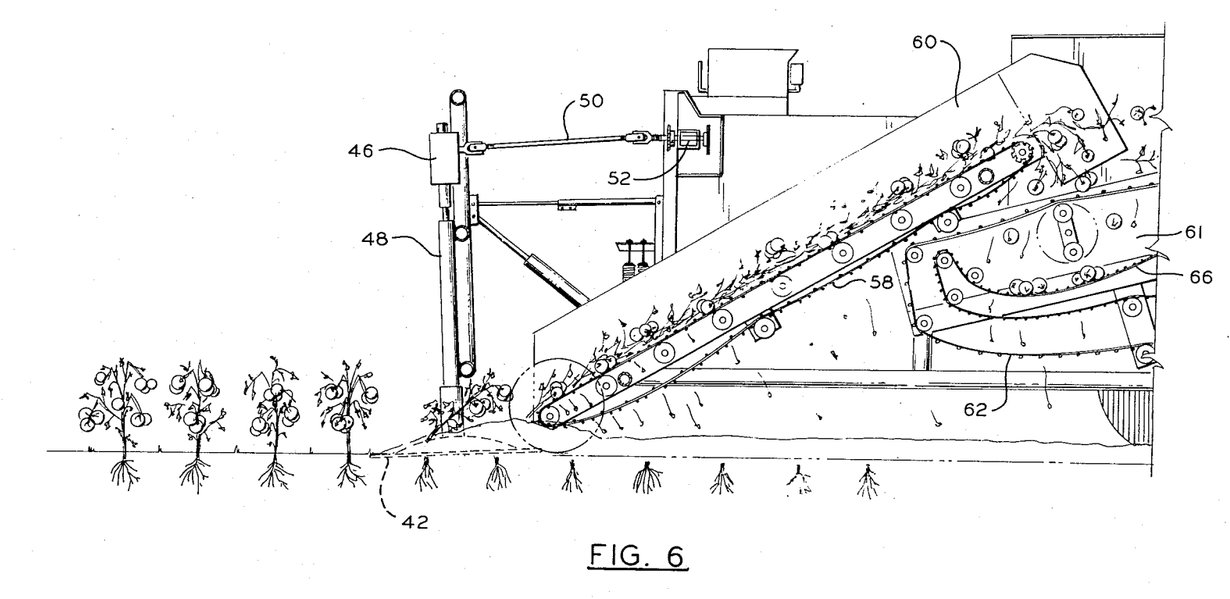
FIG. 6 is a fragmentary side elevational view of the forward portion of the apparatus in section on the line 6—6 of FIG. 4.

It will be noted from FIGS. 1 and 6 that sleeves 48 and the rotatable shafts therein, which are concentric with the axes of discs 42, are tilted slightly forward so that the disks slope upwardly from their leading edges. Adjustable support mechanism described later in more detail maintains the leading edges of disks at a desired vertical position, preferably a short distance below the surface of the soil over which the machine is traveling. Thus, as the machine moves along a row of tomatoes, with the main stems of the plants substantially in a line with the overlapped portions of the disks, a layer of soil is lifted and moved rearwardly across the central portions of the disks. Also, the plants are severed substantially at ground level as the stems come between the counter rotating saw tooth cutting edges of disks 42. This action is shown and described in greater detail in copending application Ser. No. 311,254, of the same inventor, filed of even date herewith.

From cutter section 20, the soil, together with the crops and plants are discharged toward feeder section 22. As best seen in FIG. 6, the lower end of inclined pick-up conveyor 58, preferably of the "potato chain" type, is positioned directly behind the trailing edges of disks 42. Conveyor 58 is provided with side shields 60, and the usual sprockets, idler rolls, and power means (one of hydraulic motors 18) for imparting rotation in the proper direction. The soil and fruit-laden plants are discharged from the trailing edges of disks 42 onto the lower end of conveyor 58 with all or most of the soil falling off the disks or through the conveyor chain. The plants are transported upwardly and rearwardly on conveyor 58 and fall off the upper end to shaker section 24 where the fruit and vines are separated.

Figure 7:
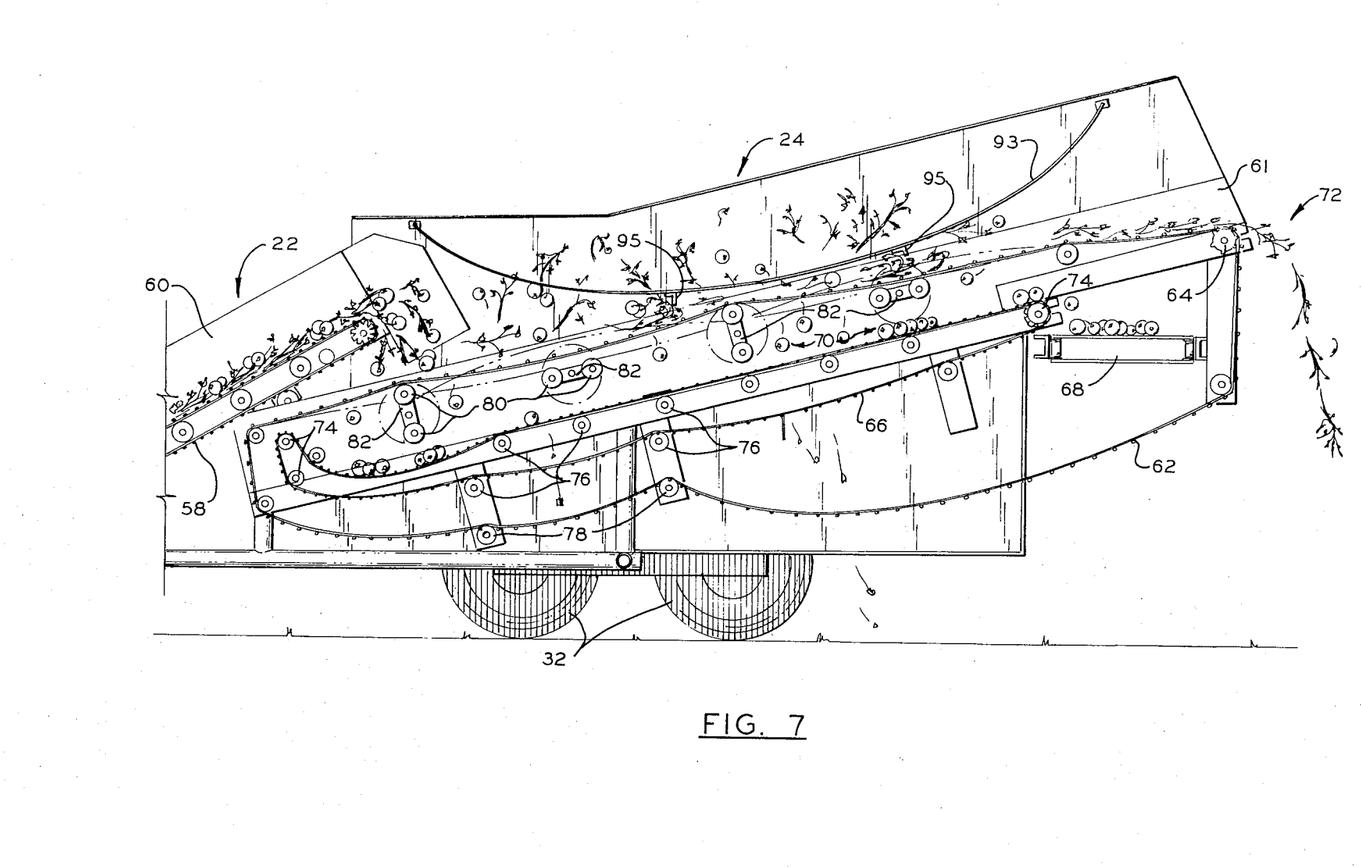
FIG. 7 is a view similar to FIG. 6 of the portion of the apparatus rearward thereof.

Shaker section 24 includes two continuous belts, one completely within the other, between side shields 61. Outer or shaker belt 62 receives the plants from feeder section 22 and is oscillated to shake the tomatoes loose from the vines. Belt 62 is formed of links spaced more widely than the largest nominal dimension of tomatoes to be harvested so that tomatoes may fall through as they become separated while the vines, in general being larger than the fruit, tend to remain on the shaker belt until they fall of at the rearmost part of the machine where shaker belt 62 passes around sprocket 64 and begins its downward travel. Inner or catcher belt 66 is formed of more closely spaced links so that tomatoes which fall through belt 62 are retained on the upper surface of this belt and transported to the upper end thereof where they fall into rear lateral conveyor belt 68. The tomatoes falling through shaker belt 62 to catcher belt 66 are indicated generally in FIG. 7 by reference numeral 70. The vines from which the tomatoes have been removed and which are being discharged from the rear of the machine are indicated by numeral 72. Belt 66 passes around sprockets 74, one or more of which is powered by one of hydraulic motors 18 to drive the belt in the proper direction at the desired speed, and intermediate idlers 76.

Figure 5:
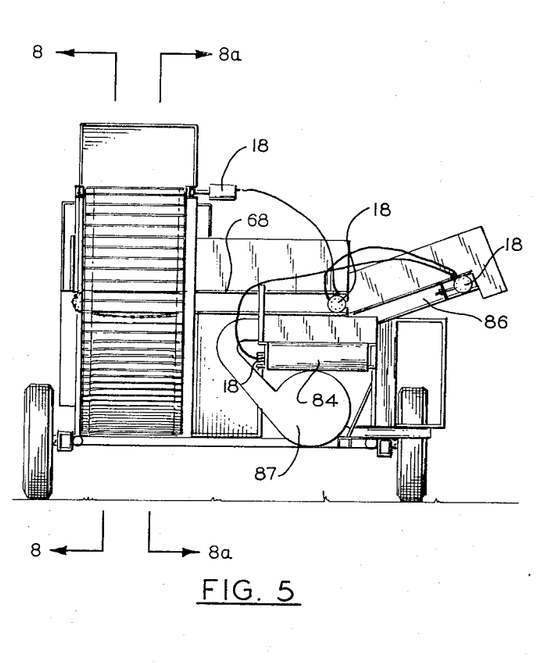

The tomatoes are transferred from belt 66 to sorting section 28 by rear lateral conveyor section 26. It will be noted in FIG. 7 that the end of belt 68 of section 26 which receives the fruit from belt 66 is likewise encircled by belt 62. Belt 68 is also a potato chain or other such open, continuous belt, and transports the fruit across the rear of the machine. As shown in FIG. 5, the fruit drops from belt 68 to sorting belt 84 near the lower end of inclined conveyor 86. Although the bulk of the vines and plants are discharged from the rear of the machine by shaker belt 62, some of the smaller pieces will fall through with the fruit and be transferred therewith to belt 68. As the tomatoes and pieces of plants fall from belt 68, the angle of elevation of conveyor 86 is such that the fruit will roll off the lower end thereof onto sorting belt 84. The pieces of plants, however, being lighter and less likely to roll or slide off, will be transported upwardly by the belt of conveyor 86, of solid rather than open like chain type, and discharged toward the side of the machine. To assist in the separation of plant fragments and other light foreign matter from the fruit at this point, blower 87 is arranged to direct an air stream across the path of material being discharged from belt 68, as also seen in FIG. 5.

The fruit deposited on sorting belt 84 is thus relatively free of plant pieces, rocks and the like. The sorting belt is of the solid type and is horizontally disposed to transport the fruit from the rear toward the front of the machine. As previously mentioned, workmen are stationed along each side of the sorting belt on platforms 38. As the fruit travels along on the sorting belt it is visually inspected and any unwanted fruit, together with any remaining foreign matter, is manually removed and thrown back into the field. Thus, only the tomatoes to be commercially used are transferred from sorting section 28 to discharge section 30.

Figure 4:
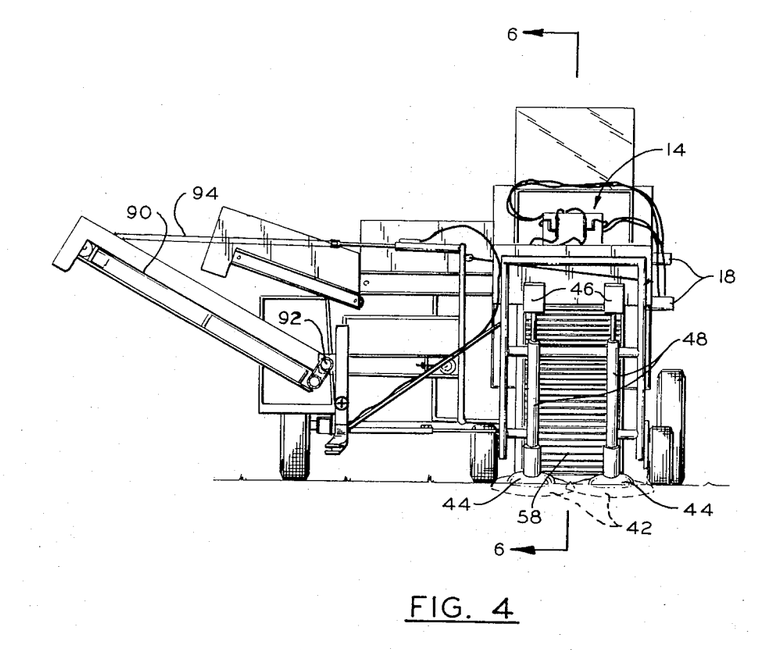
FIGS. 4 and 5 are front and rear views, respectively, of the same apparatus.

The discharge section is laterally disposed in order to discharge fruit from the side of the machine. From sorting belt 84, the fruit is deposited on a short, horizontally disposed belt 88, from which it is transferred to upwardly inclined belt 90 (FIG. 3). The latter forms a portion of the final discharge conveyor which is pivoted to the frame at 92 (FIG. 4) and supported by adjustable arm 94. The position of the top end of the final discharge conveyor may thus be selectively adjusted for discharging the produce to an adjacent vehicle, or other receiving means. Both belts 88 and 90 are of the solid type, as seen in FIG. 3.

Figure 8:
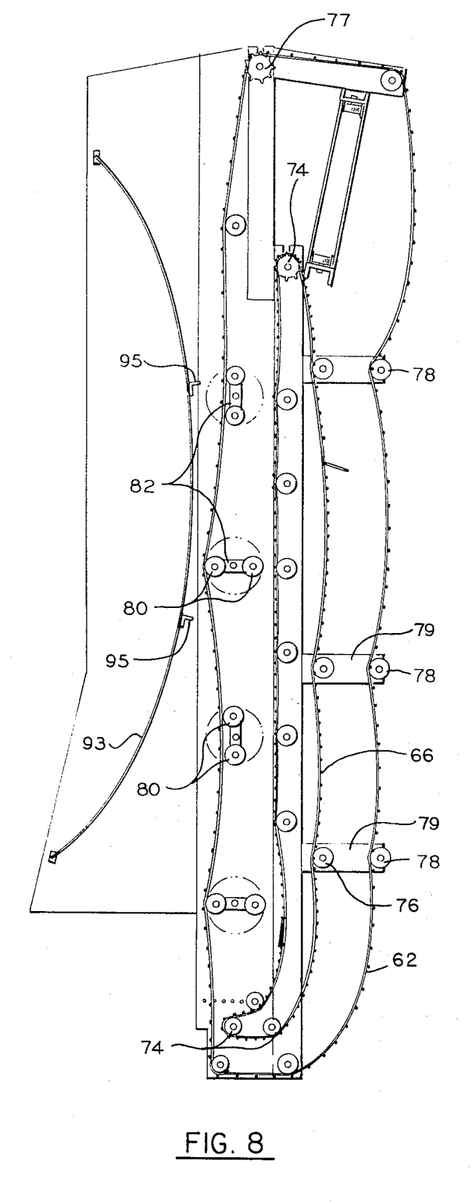
FIG. 8 is a side elevational view of one side of the motion imparting mechanism of the shaker portion, taken on the line 8—8 of FIG. 4.
Figure 8A:
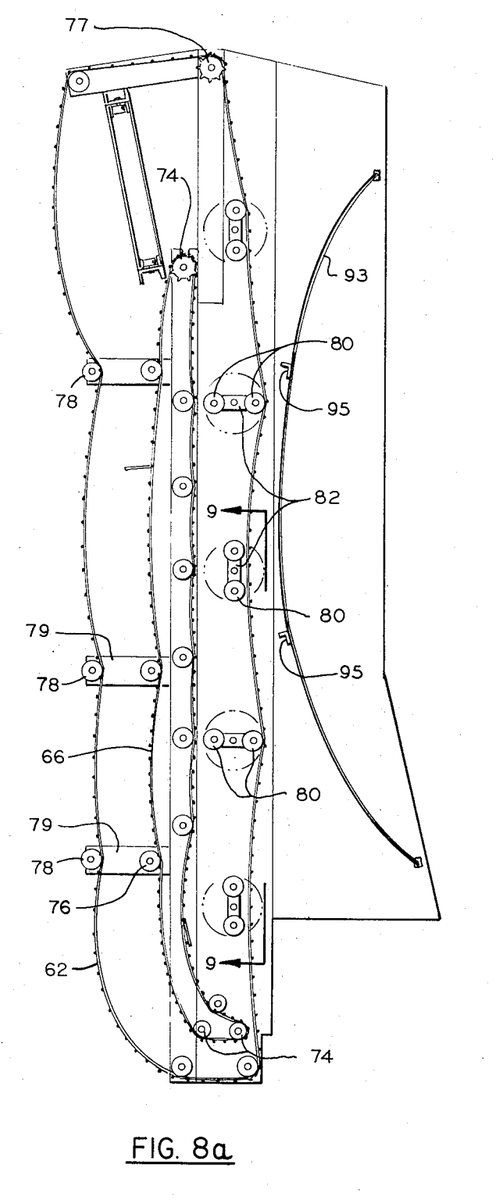
FIG. 8a is a side elevational view of the opposite side of the shaker portion, taken on the line 8a—8a of FIG. 4, FIGS. 8 and 8a being positionally related on the sheet in the same manner as in the machine to show more clearly the cooperative action of this portion of the machine.
Figure 9:
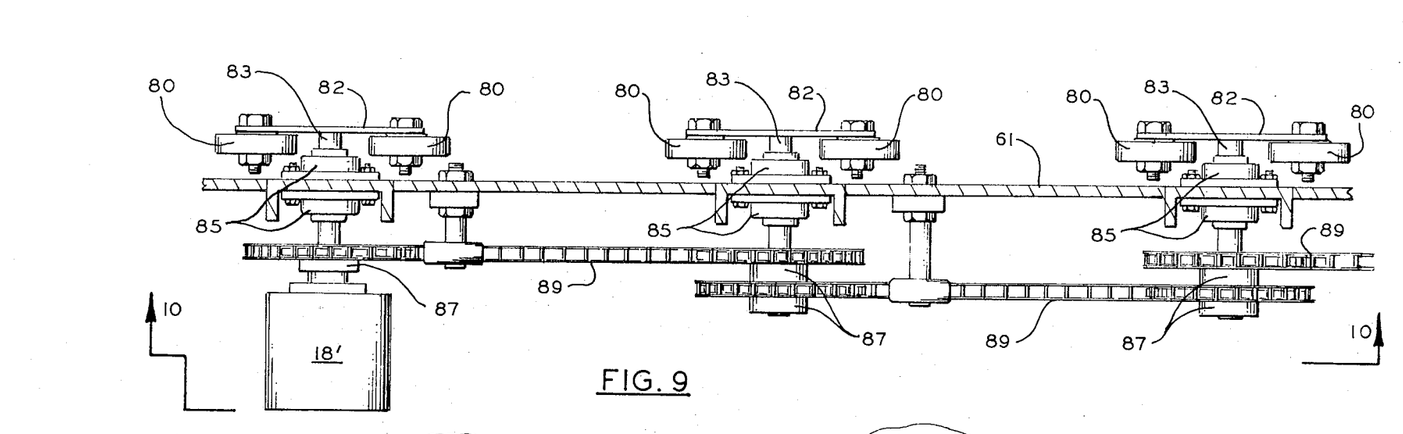
FIG. 9 is a fragmentary, sectional view taken on the line 9—9 of FIG. 8.
Figure 10:
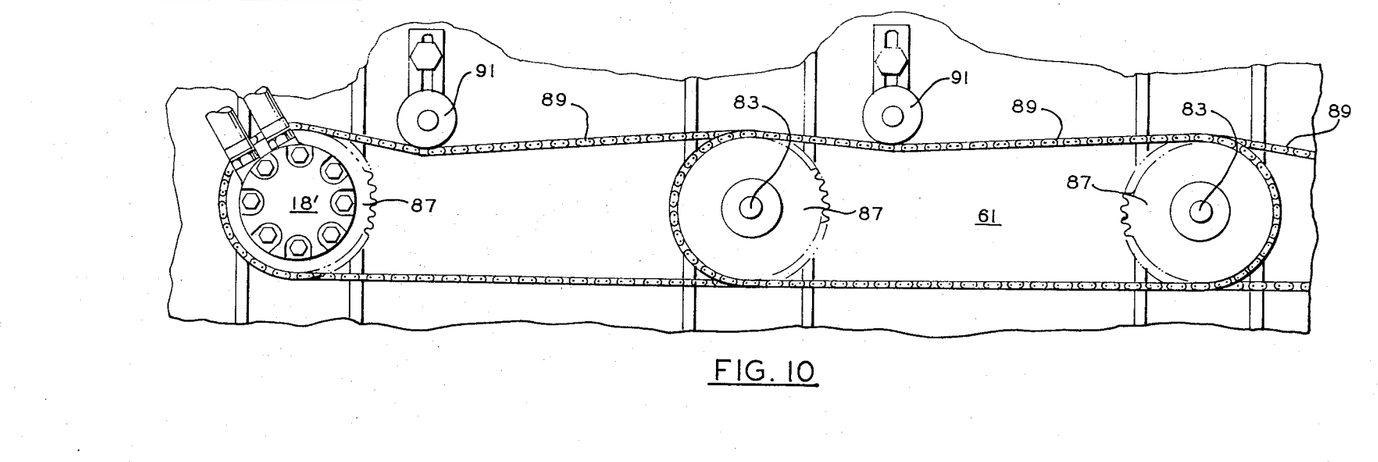
FIG. 10 is a fragmentary, sectional view taken on the line 10—10 of FIG. 9.

Turning now to FIGS. 8-10, the structure providing the unique oscillatory motion to the shaker belt is shown in greater detail. FIGS. 8 and 8a show both sides of shaker section 24 from the inside, that is, as though sectioned at the center and the two sides spread apart, in order to illustrate clearly the positional relationship of the various parts. Shaker belt 62 is powered by one or more hydraulic motors 18 connected to drive sprockets such as 77. In the lower portion of its travel belt 62 is supported by idler rollers 78 which may conveniently be mounted on the same arm extensions 79 as idler rolls 76 of belt 66.

The upper portion of belt 62, upon which the plants are transported as the fruit is separated, is supported on rollers 80 mounted on each end of arms 82, a plurality of such assemblies being provided along each side of the shaker belt. Arms 82 are mounted at their centers on shafts 83 which extend through bearings 85, the latter being bolted to supporting portions of side shields 61. Two sprockets 87 are secured to each of shafts 83 on the end opposite arms 82. Hydraulic motor 18' (FIGS. 9 and 10) is directly connected to shaft 83 of the first arm assembly and carries a single sprocket 87 which is connected by chain 89 to the inside sprocket of the next adjacent shaft 83. Similar chains 89 are provided to connect sprockets of each adjacent shaft, with the last shaft (i.e., that furthest from motor 18') carrying a single sprocket. Idlers 91 are adjustably mounted on portions of side shields 61 to remove slack from claims 89.

The structure and orientation of the assemblies comprising rollers 80, arms 82, etc., contribute to the effective removal of the tomatoes from the plants. As the arms along each side of belt 66 are rotated the two rollers on opposite ends thereof alternately engage and support the belt, imparting an oscillating motion normal to the direction of belt travel in the vicinity of each arm.

It will be noted from FIGS. 8 and 8a that adjacent arms along each side are oriented at 90° to one another.

Thus, portions of belt 66 will be undergoing the aforementioned oscillatory motion in one direction as adjacent portions are moving in the opposite direction, thereby producing a wavelike motion along each side of the belt. Furthermore, these motions may be kept out of phase by orienting the opposing arms of each pair (i.e., the arms directly opposite one another on each side of the belt) at 90° as shown in FIGS. 8 and 8a. This produces an oscillating side-to-side tipping motion in addition to the wave motion.

It will be further noted that right hand side (as shown in FIG. 8a) of the shaker section has a rotary arm assembly nearest the discharge end of belt 66 which is opposed by an idler roll on the left side, rather than another arm assembly. This has the effect of eccentrically (i.e., at one side only) tensioning or stretching belt 66 in an oscillating manner as the additional arm rotates.

In FIG. 9 three adjacent arm assemblies are shown with all arms oriented in the same direction. It is preferred, however, that adjacent arms be at different orientations, such as shown in FIGS. 8 and 8a, in order to achieve the wave motion along each side of the belt. Rather than orienting opposing arms on the two sides at 90°, and maintaining such relationship, as also shown in FIGS. 8 and 8a, the sprocket driven by the hydraulic motor on one side may have a different diameter, or number of teeth, than the one on the other side. For example, the "master" sprockets on the two sides may be in a 40-25 ratio, with the sprockets on each of the other shafts equal to one another. This will produce a constantly changing relative orientation of the arms of opposing pairs.

Affixed to suitable supports within shaker section 24 to be suspended above belt 66 are straps 93 having lugs 95 projecting therefrom toward the belt. A pair of spaced, parallel straps a few inches wide may be provided, with lugs of the same width, spaced a short distance from belt 66 at the midpoint of both straps and belt. As the plants are carried along by the belt they are engaged by the straps and lugs, which tends to cause the plants to turn over so that the opposite side is next to the belt. This action may take place twice, as the plants pass each of lugs 95, and is helpful in removing all fruit or vegetables from the plants or vines. That is, only those crops on the side of the plant next to the belt may be discharged, and the turning action helps insure that all sides of the plant will contact the belt for at least a portion of the travel.

The tomatoes are transferred from belt 66 to sorting section 28 by rear lateral conveyor section 26. It will be noted in FIG. 7 that the end of belt 68 of section 26 which receives the fruit from belt 66 is likewise encircled by belt 62. Belt 68 is also a potato chain or other such open, continuous belt, and transports the fruit across the rear of the machine. As shown in FIG. 5, the fruit drops from belt 68 to sorting belt 84 near the lower end of inclined conveyor 86. Although the bulk of the vines and plants are discharged from the rear of the machine by shaker belt 62, some of the smaller pieces will fall through with the fruit and be transferred therewith to belt 68. As the tomatoes and pieces of plant fall from belt 68, the angle of elevation of conveyor 86 is such that the fruit will roll off the lower end thereof onto sorting belt 84. The pieces of plants, however, being lighter and less likely to roll or slide off, will be transported upwardly by the belt of conveyor 86, of solid rather than open link chain type, and discharged toward the side of the machine. To assist in the separation of plant fragments and other light foreign matter from the fruit at this point, blower 87 is arranged to direct an air stream across the path of material being discharged from belt 68, as also seen in FIG. 5.

The fruit deposited on sorting belt 84 is thus relatively free of plant pieces, rocks and the like. The sorting belt is of the solid type and is horizontally disposed to transport the fruit from the rear toward the front of the machine. As previously mentioned, workmen are stationed along each side of the sorting belt on platforms 38. As the fruit travels along on the sorting belt it is visually inspected and any unwanted fruit, together with any remaining foreign matter, is manually removed and thrown back into the field. Thus, only the tomatoes to be commercially used are transferred from sorting section 28 to discharge section 30.

The discharge section is laterally disposed in order to discharge fruit from the side of the machine. From sorting belt 84, the fruit is deposited on a short, horizontally disposed belt 88, from which it is transferred to upwardly inclined belt 90 (FIG. 3). The latter forms a portion of the final discharge conveyor which is pivoted to the frame at 92 (FIG. 4) and supported by adjustable arm 94. The position of the top end of the final discharge conveyor may thus be selectively adjusted for discharging the produce to an adjacent vehicle, or other receiving means. Both belts 88 and 90 are of the solid type, as seen in FIG. 3.

What is claimed is:

1. Harvesting apparatus for separating tomatoes, and like crops, from plants on which they are growing, said apparatus comprising, in combination:
   a. a first continuous conveyor chain for receiving plants with attached fruit on an upper portion at a receiving end and having support members spaced more widely than the largest nominal dimension of fruit being harvested;
   b. a second continuous conveyor chain encircled by said first chain and having support members spaced more closely than the smallest nominal dimension of fruit being harvested;
   c. means for imparting oscillatory motion to at least the upper portion of said first chain, the magnitude and speed of said oscillatory motion being sufficient to dislodge the fruit from the plants, whereby the fruit falls through said first chain to be received on said second chain said oscillatory motion imparting means comprising a plurality of straight arms mounted for rotation about their centers in spaced relation along the lower side of said upper portion on both lateral sides thereof, successive arms along each of said lateral sides being arranged at substantially 90° from one another, and the arms along one of said lateral sides being arranged substantially opposite the arms along the other side and opposite arms are arranged at substantially 90° from one another; and
   d. means for separately discharging the plants from said first chain at a discharge end thereof, and the fruit from said second chain.

2. The invention according to claim 1 wherein a greater number of said arms are mounted along one of said lateral sides than along the other.

3. The invention according to claim 1 wherein the arms are of the same length and the arms along one of said lateral sides are driven at a different rotational speed than the arms along the other side.

4. The invention according to claim 1 and further including a third continuous conveyor chain having a forward end near ground level for receiving plants with attached fruit therefrom, and an elevated rear end discharging said plants and fruit onto said first conveyor chain.

5. The invention according to claim 1 and futher including means for turning the plants as they are transported by said first conveyor chain, whereby different sides of the plants contact said first chain during transport.

6. The invention according to claim 5 wherein said turning means comprise at least one stationary member positioned in spaced relation above said first chain, between said receiving and discharge ends, for contact by plants transported thereon, whereby the upper sides of the plants are held by said stationary member as the lower sides are moved by said shaker belt to turn the plants on the chain.

7. The invention according to claim 6 wherein said turning means comprise at least one strap extending parallel to the direction of travel of said first chain and having a lug extending toward the chain.

8. The invention according to claim 5 wherein said means for collecting comprise a second continuous belt rotatable about horizontal axes and located below the upper portion of said shaker belt.

9. The invention according to claim 8 wherein said second belt is formed of transverse links spaced more closely than the smallest nominal dimension of the crops being harvested.

10. The invention according to claim 9 wherein said second belt is encircled by said shaker belt.

* * * * *